United States Patent
Shetty (10) Patent No.: US 8,010,973 B2
(45) Date of Patent: Aug. 30, 2011

(54) CLASS LOADER FOR MANAGING A NETWORK

(75) Inventor: Ritesh Shetty, Goleta, CA (US)

(73) Assignee: Calix, Inc., Petaluma, CA (US)

( * ) Notice: Subject to any disclaimer, the term of this patent is extended or adjusted under 35 U.S.C. 154(b) by 1124 days.

(21) Appl. No.: 11/756,595

(22) Filed: May 31, 2007

(65) Prior Publication Data

US 2008/0301710 A1 Dec. 4, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl. ........ 719/330; 719/331; 719/332; 717/162; 717/163; 717/164; 717/165; 717/166; 717/167; 717/170

(58) Field of Classification Search ................. None
See application file for complete search history.

(56) References Cited

U.S. PATENT DOCUMENTS 6,430,570 B1 * 8/2002 Judge et al. .............. 717/166
7,415,706 B1 * 8/2008 Raju et al. ................. 717/170

OTHER PUBLICATIONS

Occam Networks, "OccamView—Element Management System" Version 5.0, 4 pages, 2006.
Occam Networks, "New Products for Your Access Network", http://www.occamnetworks.com/products/new_products/index.cfm, Feb. 13, 2007, 2 pages.
Occam Networks, "BLC6000—Broadband Loop Carrier 6000 System", 3 pages, 2006.
"Java Remote Method Invocation", Wikipedia, the Free Encyclopedia, http://en.wikipedia.org/wiki/Java_RMI, Feb. 13, 2007, 2 pages.
Reilly, David, "Introduction to JAVA RMI", http://www.javacoffebreak.com/articles/javarmi/javarmi.html, Feb. 27, 2007, 8 pages.
Venners, Bill, "Security and the Class Loader Architecture", JavaWorld, Sep. 1, 1997, http://www.javaworld.com/javaworld/jw-09-1997/jw-09-hood.html, 6 pages.
"Java Bytecode", Wikipedia, the Free Encyclopedia, http://en.wikipedia.org/wiki/Java_bytecode, Feb. 13, 2007, 16 pages.
"Library (Computing)", Wikipedia, the Free Encyclopedia, http://en.wikipedia.org/wiki/Library_%28software%29, Feb. 13, 2007, 7 pages.
"Java Virtual Machine", Wikipedia, the Free Encyclopedia, http://en.wikipedia.org/wiki/Java_Virtual_Machine, Feb. 13, 2007, 4 pages.

(Continued)

*Primary Examiner* — Qing Wu
(74) *Attorney, Agent, or Firm* — Blakely, Sokoloff, Taylor & Zafman LLP.

(57) ABSTRACT

Methods, apparatuses, and systems for managing a network with a non-system class loader via remote method invocation are described. A method includes transferring the Java remote method invocation (RMI) call to a network element in order to obtain a version of the management software associated with the network element. The method further includes determining if a requested class to be loaded by a class loader based on the RMI call belongs to a system namespace or a non-system namespace. The method further includes obtaining a byte code associated with the requested class from a class hash with a class name key if the requested class belongs to the non-system namespace. The method further includes loading the requested class and associated byte code to a Java virtual machine with a non-system class loader if the requested class belongs to the non-system namespace.

29 Claims, 5 Drawing Sheets

OTHER PUBLICATIONS van de Linden, Peter, "Not Just Java", Sun Microsystems, The Sunsoft Press, Java Series, Chapters 3 and 6, 60 pages, 1997.

WROX, "Professional Java Server Programming", Chapter 12, 15 pages, 1999.

Peter Van Der Linden, Chapter 3, "Java Systemwide Features" Publisher: Prentice Hall Professional Technical Reference, Feb. 1, 1997, pp. 69-99.

Peter Van Der Linden, Chapter 6, "Java Systemwide Features" Publisher: Prentice Hall Professional Technical Reference, Feb. 1, 1997, pp. 169-193.

Danny Ayers et al., Chapter 12, "Distributed Computing with Servlets", Professional Java Server Programming with Servlets, JavaServer Pages (JSP), XML, Enterprise JavaBeans (EJB), JNDI, CORBA, Jini and Javaspaces, Publisher: WROX Press Ltd, illustrated edition, Aug. 1, 1999, pp. 240-251.

Russ Sharer, "FTTH not free from urban legends", LIGHTWAVE magazine, Jul. 2006, pp. cover, 25, and 29.

Roger Cheng, "How Niche Telecom-Gear Vendors Plan to Gain on Network Upgrades", The Wall Street Journal, Sep. 20, 2006, pp. 2 total.

Ed Gubbins, "Occam sees 75% annual revenue growth", Telephony Online, Feb. 2, 2007, pp. 1 total.

Wikipedia, "Command line interface", http://replay.waybackmachine.org/20050501163402/http://en.wikipedia.org/wiki/Command... Apr. 30, 2005, pp. 2 total.

Wikipedia, "Simple Network Management Protocol", http://replay.waybackmachine.org/20060915123232/http://en.wikipedia.org/wiki/Simple_... Sep. 9, 2006, pp. 6 total.

Wikipedia, "OSI model", http://replay.waybackmachine.org/20070421200413/http://en.wikipedia.org/wiki/OSI_model, Apr. 20, 2007, pp. 6 total.

* cited by examiner

| class name 510 | byte code 520 |
|---|---|
| class name 1 | byte code 1 |
| class name 2 | byte code 2 |
| class name 3 | byte code 3 |
| . . . | . . . |
| class name N | byte code N |

| MS version 560 | class loader 570 |
|---|---|
| 1 | class loader 1 |
| 2 | class loader 2 |
| 3 | class loader 3 |
| . . . | . . . |
| N | class loader N |

FIG. 5B

CLASS LOADER FOR MANAGING A NETWORK

FIELD

Embodiments of the invention relate to the field of network management. More particularly, embodiments of the invention are directed to remote method invocation for management of the network with a class loader.

BACKGROUND

A network having numerous network elements can provide voice, data, and video communications across a pure packet network. Typically, the packets conform to a single protocol of a single layer of the International Organization for Standardization's Open System Interconnection ("OSI") Model. The single protocol may be the internet protocol (IP). The network elements can be broadband loop carriers that include switching, routing, aggregation, and plain old telephone service (POTS) functionality. High speed Internet, VoIP, IP video and gaming are some of the increasing number of applications that rely on an IP service delivery model. Advanced, layer specific service management, fault isolation, and pro-active diagnostic tools are some of the features that are required for day-to-day network operations.

In order for a system to perform successfully in a user environment, it is necessary that the user be able to configure the system to operate as desired, and to be able to observe the network elements for troubleshooting, monitoring, and management purposes. Management can be effected through a variety of user interfaces. The most common is Command Line Interface (CLI), where configuration and display commands are entered in text mode and promptly executed. Another common interface is Simple Network Management Protocol (SNMP) where configuration and monitoring data is transmitted over the network.

A Java based model provides a much broader and more abstract framework in a Java platform. A Java Virtual Machine (JVM) interprets and executes Java byte code that has been generated by a compiler. In Java, a "class" represents a set of instructions. A primordial class loader loads a class into the JVM whenever the class has been referenced. The primordial class loader locates the class to be loaded by locating the appropriate class path. The class is read from a jar file, a collection of classes, or from a local file system referenced in the class path.

A Java remote method invocation (RMI) client server model can be the underlying architecture for a management application. An external entity in order to manage the network elements in the network communicates with exposed RMI application programming interfaces (APIs). An API is a source code interface that a computer system or program library provides in order to support requests for services from a software application. An API is specified in terms of a programming language that can be interpretative or compiled when an application is built, rather than an explicit low level description of how data is laid out in memory. A Java RMI API is a mechanism to invoke a method or function call on an object that exists in another address space. The other address space can be on the same machine or a different machine. The invoking entity is called a client while the invoked entity is called a server. A managing entity that manages a network of network elements should have remote interfaces and data classes of a management RMI API available in an application path of the managing entity. The interfaces and data classes of the management RMI API are usually made available in a jar file. The interfaces and data classes in the jar file may vary across different versions of the management software. The managing entity needs to have multiple versions of jar files to manage network elements that have different versions of the management software.

The fact that the remote interfaces and the data classes belong to the same namespace (e.g., a directory in an operating system) and can be different across various software versions presents a great challenge for the managing entity. A class loader may load a class with the correct namespace but corresponding to the wrong software version being run by a network element. Also, the different versions of the management software may require different parameters in order to manage the network element associated with a particular version of the management software. For example, sending a management call appropriate for software version A to a network element running software version B may result in an exception condition causing a crash or other error.

SUMMARY

In an environment with management software interacting with network elements via a remote method invocation (RMI) call, a method is described that includes transferring the remote method invocation (RMI) call to a network element in order to obtain a version of the management software associated with the network element. The method further includes determining if a requested class to be loaded by a class loader based on the RMI call belongs to a system namespace or a non-system namespace. The method further includes obtaining a byte code associated with the requested class from a class hash with a class name key if the requested class belongs to the non-system namespace. The method further includes loading the requested class and associated byte code to a Java virtual machine (JVM) with the non-system class loader if the requested class belongs to the non-system namespace. The non-system class loader loads classes having a common namespace and associated with different versions of the management software. For one embodiment, the non-system class loader dynamically learns and loads a plurality of generic Java applications having a common namespace.

Other features and advantages of embodiments of the invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings in which like references indicate similar elements.

DETAILED DESCRIPTION

A method for using management software to manage a network is described. In an environment with management software interacting with network elements via a remote method invocation (RMI) call, the method includes transferring the remote method invocation (RMI) call to a network element in order to obtain a version of the management software associated with the network element. The method further includes determining if a requested class to be loaded by a class loader based on the RMI call belongs to a system namespace or a non-system namespace. The method further includes obtaining a byte code associated with the requested class from a class hash with a class name key if the requested class belongs to the non-system namespace. The method further includes loading the requested class and associated byte code to a Java virtual machine (JVM) with a non-system class loader if the requested class belongs to the non-system namespace.

An intended advantage of the non-system or custom class loader is the ability to manage network elements running disparate versions of management software. For one embodiment, the non-system class loader dynamically learns and loads a plurality of generic Java applications having a common namespace.

Figure 1:
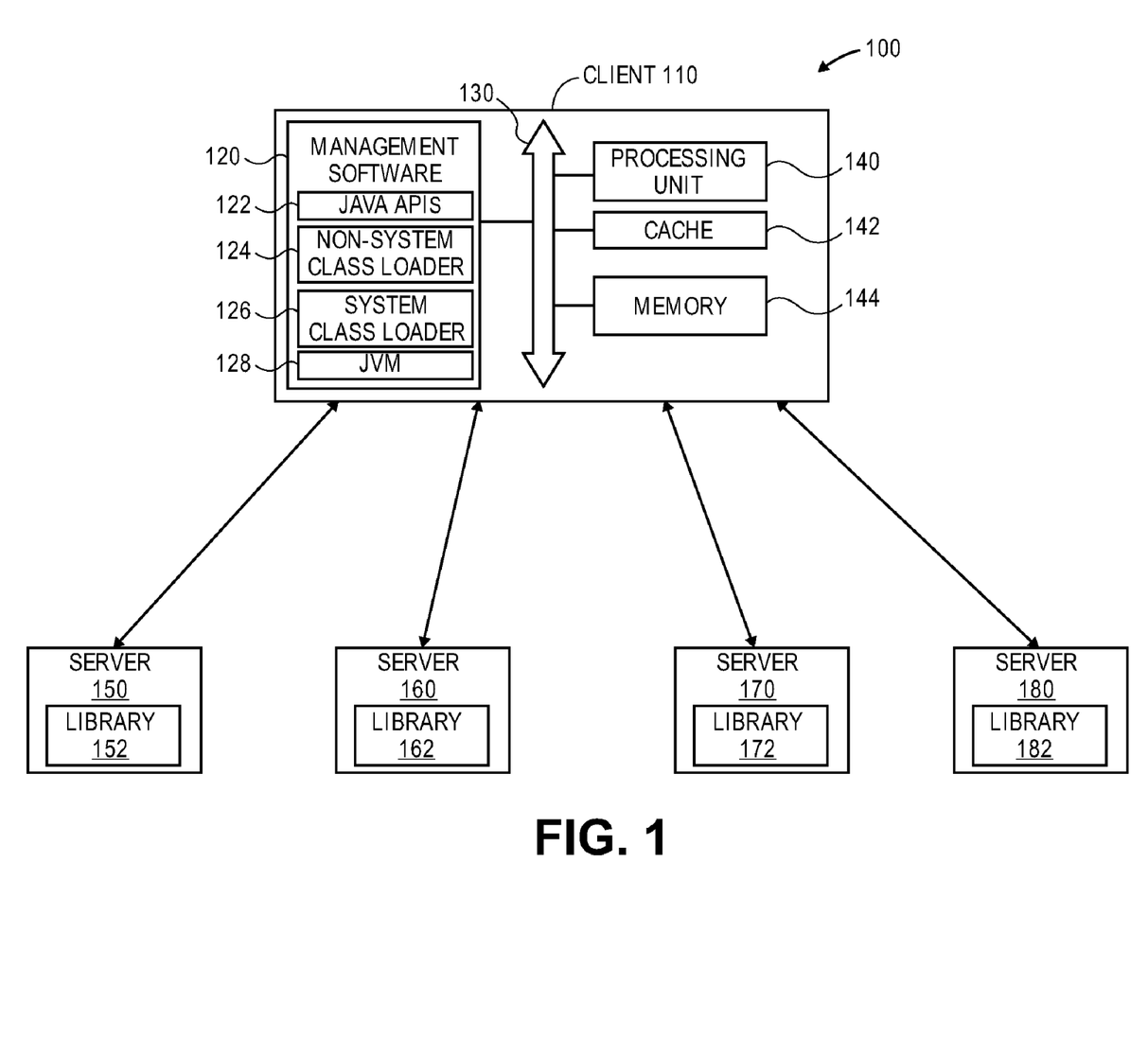
FIG. 1 is a block diagram of a client with management software interfacing with servers in accordance with an embodiment of the present invention.

FIG. 1 illustrates a system 100 that includes a client 110 for managing servers 150, 160, 170, and 180. Management may include configuration, status, restoration, and parametric functionality. The system 100 represents a remote method invocation (RMI) client server model. The client 110 includes management software 120, a bus 130, a processing unit 140, a cache 142, and a memory 144. The management software 120 includes Java APIs 122, a non-system class loader 124, a system class loader 126, and a Java virtual machine (JVM) 128. For one embodiment, the management software 120 includes client software to provide a user interface to a front end server, a backend server software to perform network functions, and the front end server software to transmit information between the client software and the back end server.

The Java APIs provides various APIs such as windowing, networking, file input/output, and programming utilities for managing the client 110 and servers 150, 160, 170, and 180. The servers 150, 160, 170, and 180 may form a network of servers. The Java APIs 122 include a remote method invocation (RMI) API for performing the object equivalent of remote procedure calls between the client 110 and various servers 150, 160, 170, and 180. RMI allows applications to call object methods located remotely, sharing resources and processing load across a network. RMI allows both a client and a server to dynamically load new object types as required.

The JVM 128 interprets and executes Java byte code, which comprises a form of instructions. Programs to be executed on the JVM 128 are typically compiled into a standardized portable byte code format, which generally is in the form of class files. For easier distribution of large programs, multiple class files may be packaged together in a jar file. The JVM 128 uses a class loader to load a class into the JVM 128 that may be operating in memory 144. For one embodiment, the Java class loader or system class loader 128 is a primordial class loader. Whenever a class is referenced, the primordial class loader locates the application or system class path. The class or classes to be loaded are then read from a jar file or a local file system given by the application class path.

For certain embodiments, the system 100 is a Java RMI client server model that forms the underlying architecture for a software application such as management software 120. Any external entity (not shown) uses the exposed RMI APIs in the client 110 in order to manage a network of servers 150, 160, 170, and 180. For one embodiment, an external entity is a remote computing system that connects to the client 110 via a network, such as a wide area network or local area network.

Each server 150, 160, 170, and 180 may have a different version of the management software 120, as represented by libraries 152, 162, 172, and 182, respectively. A library is a collection of subprograms used to develop software. Many operating systems provide libraries that implement the majority of system services. The operating system of the management software 120 may have numerous versions located in the various libraries 152, 162, 172, and 182. RMI calls from the client 110 to a server include parameters that may vary between different versions of the management software 120. The RMI calls need to have the appropriate parameters for the version of management software 120 associated with a server being called by the client 110. Otherwise, an error, fault, or exception condition may occur.

For one embodiment, an external or managing entity starts a client application with a Java applet by accessing the management software 200 via a wide area network or local area network such as the internet or Ethernet, respectively. The managing entity receives a view of the network of servers 150, 160, 170, and 180 via the Java applet. The managing entity can then configure and manage the network of servers or other network elements. The managing entity has access to remote interfaces and data classes of the RMI API stored in jar files in order to manage the network of servers or other network elements. The remote interfaces and data classes may vary across different versions of the management software 120 and belong to the same namespace because a particular function call has the same name for all servers within the network of the servers 150, 160, 170, and 180.

For certain embodiments, a non-system class loader 124 or custom class loader library allows a software application to over-ride the default system class loader 126 and control the class loading. The non-system class loader 124 enables a single entity, the system 100, to manage the servers 150, 160, 170, and 180 or any collection of network elements running disparate software versions in a network such as a telecommunications network. The network elements may be broadband loop carriers that provide voice and data communications via the network.

In contrast, a prior art approach for managing a network would require a separate system for each software version or would use the system class loader 126 which would load the first library 152, 162, 172, or 182 found in an application class path. The library loaded may not correspond to the library being run by a particular server 150, 160, 170, or 180, leading to an exception, error, or fault condition.

The processing unit 140 may execute the management software 120 in order to manage the servers 150, 160, 170, and 180. For example, execution of the management software 120 transfers a Java remote method invocation (RMI) call to server 150 in order to obtain a version of the management software 120 associated with the server 150. Then, execution of the management software 120 occurs in order to determine if a requested class to be loaded by a class loader based on the RMI call belongs to a system namespace or a non-system namespace. The non-system class loader 124 loads classes having a common namespace and associated with different versions of the management software 120. The management software 120 manages the network of network elements that form at least two sets of network elements with each set running a disparate software version of the management software.

Figure 2:
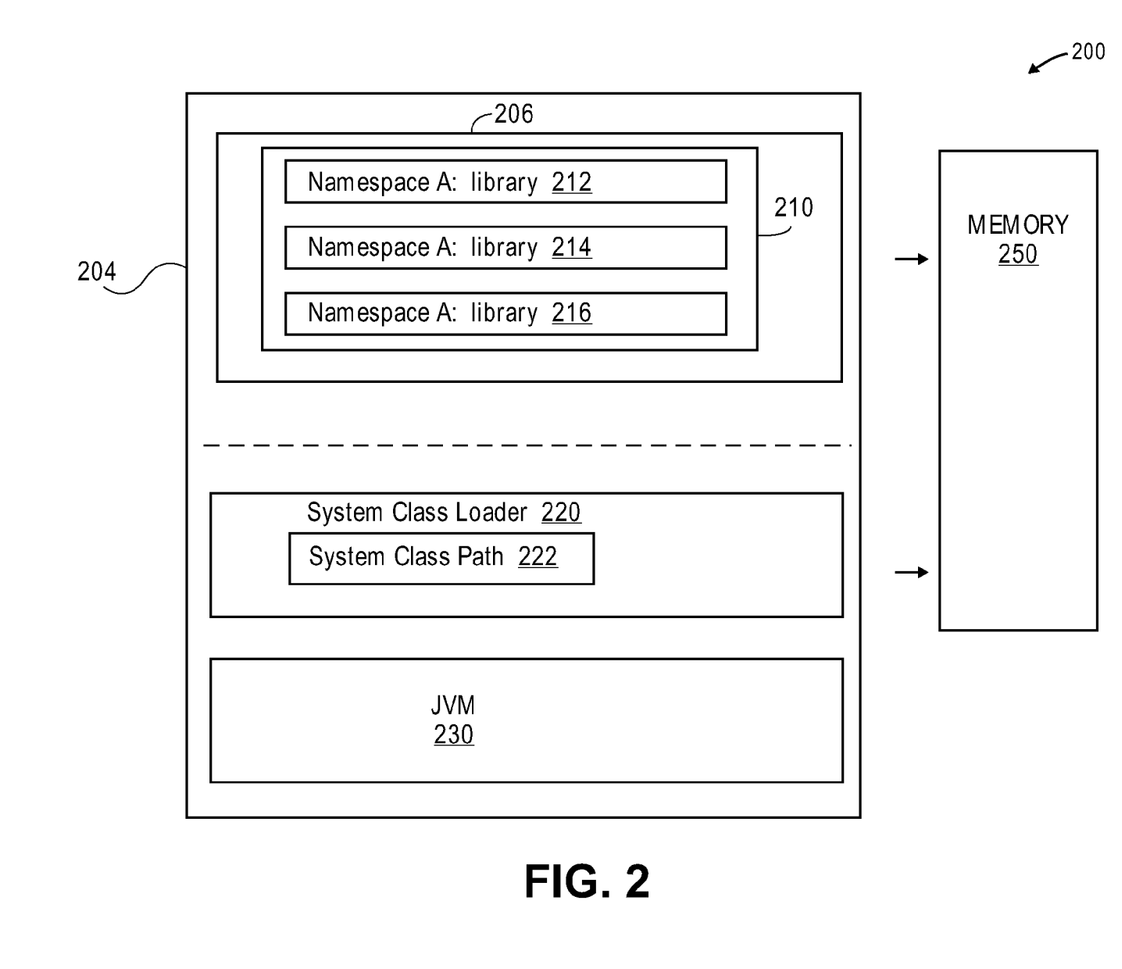
FIG. 2 shows details of management software with class loaders for loading classes into a Java virtual machine (JVM) in accordance with an embodiment of the present invention.

FIG. 2 shows management software 200, which provides management for a group of servers or network elements, such as illustrated in FIG. 1. Management software includes a RMI 204, system class loader 220, and Java virtual machine (JVM) 230. The RMI 204 includes a mediation agent 206 for communicating with network elements or other devices. The mediation agent 206 includes a non-system class loader 210, which may dynamically at runtime access a library 212, a library 214, and/or a library 216 that all share a common namespace A in accordance within an embodiment of the invention.

At runtime, a Java application can install class loader objects that load classes in custom ways, such as by downloading class files across a network. Class loader objects are written in Java, compiled into class files, loaded into the JVM 230, and instantiated just like any other object. The non-system class loader 210 dynamically extends a Java application at runtime. At runtime, the management software 200 can determine what extra classes are needed based on RMI calls and load the classes through one or more class loader objects.

The non-system class loader 210 loads a particular library associated with a particular software version via the JVM 230 into memory 250 at runtime in response to a RMI call retrieving the particular software version being run on a particular network element that is being managed, configured, or monitored. Each library may correspond to a different version of an operating system (OS) such as an OS of the management software 200. Various network elements within a network being managed by the management software may have different versions of the OS of the management software 10. The management software manages the network of network elements that form at least two sets of network elements with each set running a disparate software version of the management software.

The non-system class loader 210 via the JVM 230 enables multiple classes belonging to the same namespace to be resident in memory 250 simultaneously. The non-system class loader 206 is customized to create a co-resident application having its own namespace. A co-resident application is defined as an application within an application with a common namespace.

The JVM 230 uses a class loader to load a class or classes into memory 250. For one embodiment, the Java class loader or system class loader 220 is a primordial class loader that is part of the JVM 230 implementation. Whenever a class is referenced, the primordial class loader locates the application class path. The class or classes to be loaded are then read from a jar file or a local file system given the application class path. The class is converted into byte code and loaded into the JVM 230 for execution by an execution engine of the JVM 230. The JVM 230 interprets a stream of byte codes as a sequence of instructions and then executes the sequence of instructions to produce a desired output.

Execution of the management software 200 may transfer a Java remote method invocation (RMI) call to a network element in order to obtain a version of the management software 200 associated with the network element (not shown). Then, execution of the management software 200 occurs in order to determine if a requested class to be loaded by a class loader based on the RMI call belongs to a system namespace or a non-system namespace. The requested class and an associated byte code are loaded into the JVM 230 with the non-system class loader 210 if the requested class belongs to the non-system namespace. The JVM 230 can then interpret and/or execute the byte code for instantiation into the memory 250.

The non-system class loader 210 loads classes having a common namespace such as namespace A and associated with different versions of the management software 120. For example, the non-system class loader 210 may load the library 212 via the JVM 230 into memory 250 if the library 212 contains the class or classes associated with the version of the management software running on a particular network element that has been issued a RMI call. The library 212 contains interface descriptions, parameters, attributes, methods, and other information associated with the particular network element needed for communicating with the network element.

Figure 3:
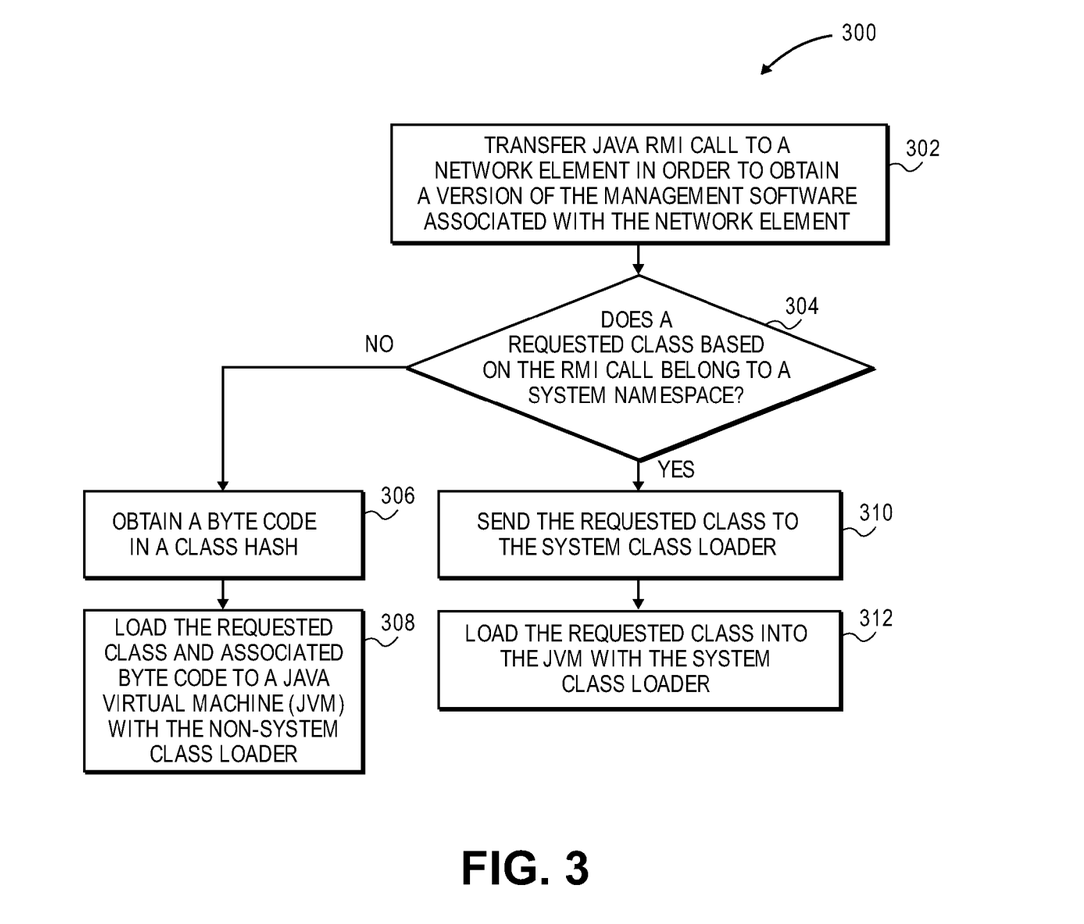
FIG. 3 is a flowchart of a method for managing a network in accordance with an embodiment of the present invention.

FIG. 3 illustrates a method for managing a network in accordance with an embodiment of the invention. In an environment with management software interacting with network elements via a Java remote method invocation (RMI) call, method 300 includes transferring the Java remote method invocation (RMI) call to a network element in order to obtain a version of the management software associated with the network element at block 302. The method 300 further includes determining if a requested class to be loaded by a class loader based on the RMI call belongs to a system namespace or a non-system namespace at block 304. The method 300 further includes obtaining a byte code associated with the requested class from a class hash with a class name key if the requested class belongs to the non-system namespace at block 306. The method 300 further includes loading the requested class and associated byte code to a JVM with a non-system class loader if the requested class belongs to the non-system namespace at block 308. The JVM interprets a stream of byte codes as a sequence of instructions and then executes the sequence of instructions to produce a desired output.

The non-system class loader loads classes having a common namespace that are associated with different versions of the management software. The requested class or classes may represent a library containing interface descriptions, parameters, attributes, methods, and other information associated with the particular network element needed for communicating with the network element. For one embodiment, the non-system class loader dynamically at Java runtime execution learns and loads a plurality of generic Java applications having a common namespace.

The method 300 further includes sending the requested class to a Java system class loader if the requested class belongs to the Java system namespace at block 310. The Java system class loader loads the requested class into the JVM at block 312. The JVM interprets a stream of byte codes as a sequence of instructions and then executes the sequence of instructions to produce a desired output.

Figure 4:
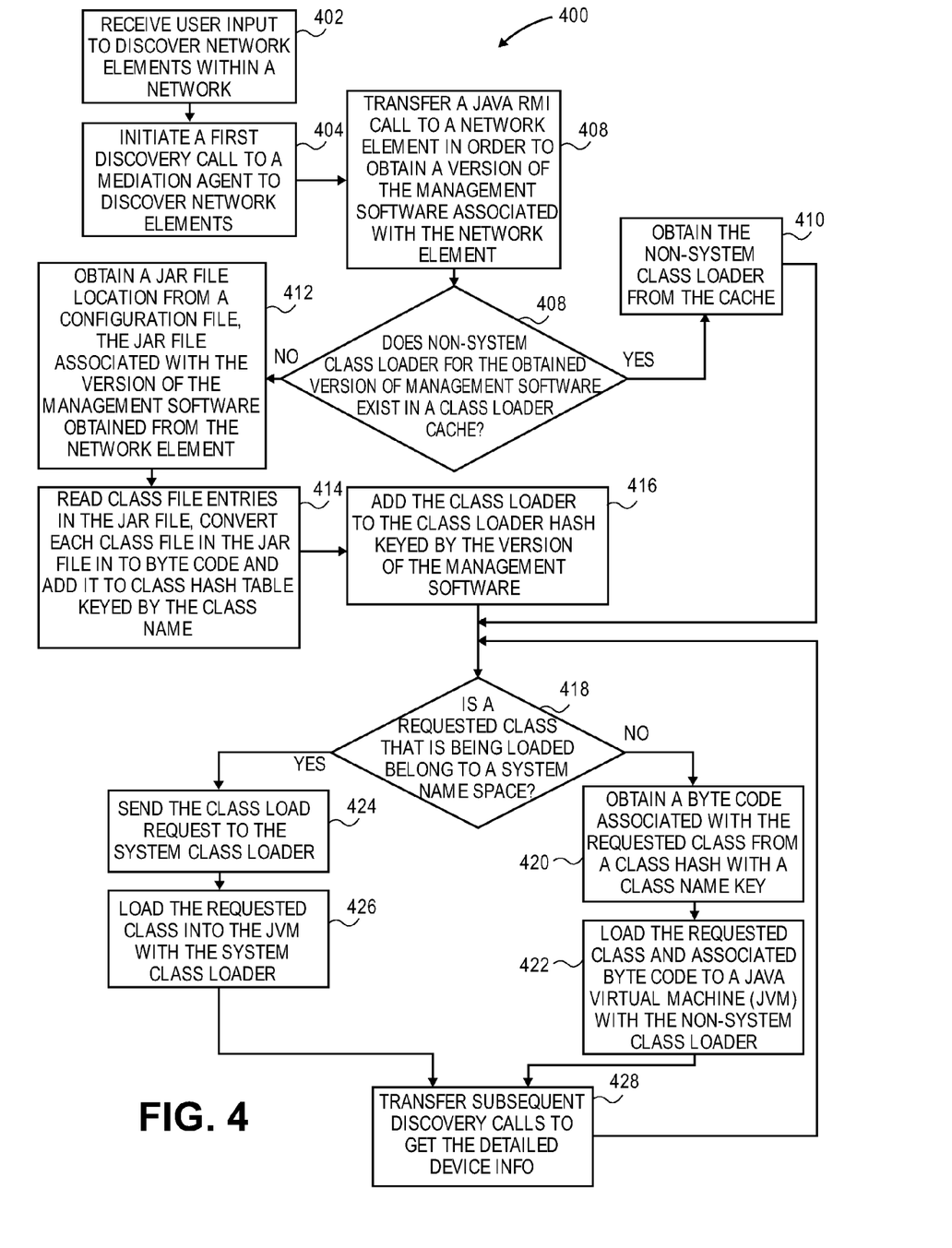
FIG. 4 is a flowchart of a method for managing a network in accordance with an embodiment of the present invention.

FIG. 4 illustrates a method for managing a network in accordance with an embodiment of the invention. The network may include a plurality of network elements that are managed from a central location such as a central office or remote terminal of a telecommunications service or maintenance provider. Management software can be stored and executed on one or more devices residing at the central location. Numerous versions of management software may exist throughout the network elements. For example, a first group of network elements may store and execute a first version of the management software and a second group of network elements may store and execute a second version of the management software.

The method 400 includes receiving a user input to discover network elements within the network at block 402. The method 400 further includes initiating a first discovery call to a mediation agent to locate or discover network elements within the network at block 404. The method 400 further includes transferring a Java remote method invocation (RMI) call to a network element in order to obtain a version of the management software associated with the network element at block 406. Transferring the Java RMI call is either one of issuing, initiating, or receiving the Java RMI call. For one embodiment, the mediation agent or other agent of the management software issues the RMI call to the network element. The method 400 further includes determining if a non-system class loader associated with the version of the management software obtained from the network element is located in a cache at block 408. The method 400 further includes obtaining the non-system class loader if the non-system class loader is located in the cache at block 410. In certain embodiments, the mediation agent determines if the non-system class loader is located in the cache at block 408.

Figure 5A:
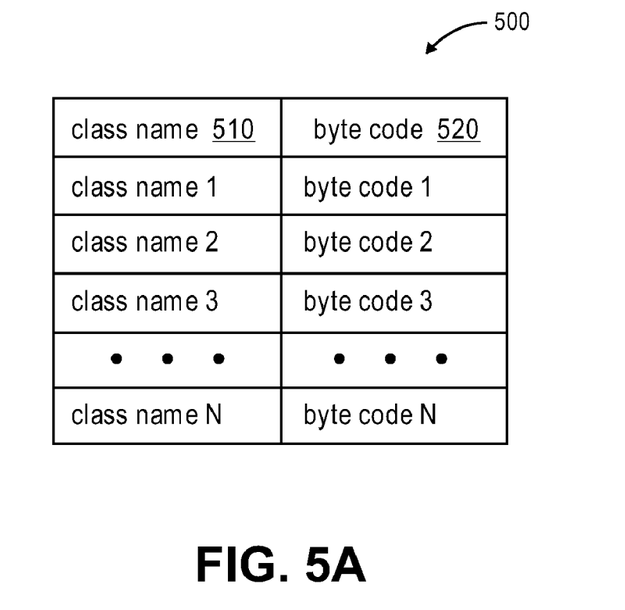
FIG. 5A illustrates a hash table keyed by class name in accordance with an embodiment of the present invention.

The method 400 further includes obtaining a jar file location from a configuration file. The jar file is associated with the version of the management software obtained from the network element if the non-system class loader is not located in the cache at block 412. The method 400 further includes reading class file entries in the jar file, converting each class file into a byte array, and adding the byte arrays into a hash table keyed by the class name at block 414. FIG. 5A illustrates a hash table keyed by class name in accordance with an embodiment of the invention. The class name column 510 is the key or index for locating the appropriate byte code 520 forming the byte arrays. For example, class name 1 is associated with byte code 1. The hash table 500 may be located in the cache or at a different memory location.

Figure 5B:
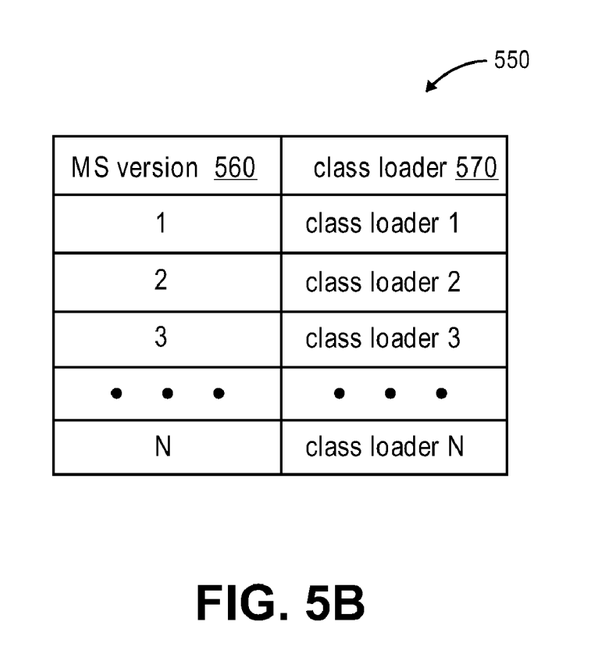
FIG. 5B illustrates a hash table keyed by software version in accordance with an embodiment of the present invention.

The method 400 further includes adding the class loader to a class loader hash table that is keyed by version of the management software associated with the class loader at block 416. FIG. 5B illustrates a hash table keyed by version of the management software associated with the class loader in accordance with an embodiment of the invention. The version column 560 is the key or index for locating the appropriate class loader 570. For example, version 1 is associated with class loader 1. The hash table 550 may be located in the cache or at a different memory location.

The method 400 further includes determining if a requested class to be loaded by a class loader based on the RMI call belongs to a system namespace or a non-system namespace at block 418. The method 400 further includes obtaining a byte code associated with the requested class from a class hash with a class name key if the requested class belongs to the non-system namespace at block 420. The method 400 further includes loading the requested class and associated byte code to a Java Virtual Machine (JVM) with a non-system class loader if the requested class belongs to the non-system namespace at block 422. The JVM processes the class and associated byte code with an execution engine. The JVM interprets a stream of byte codes as a sequence of instructions and then executes the sequence of instructions to produce a desired output. The non-system class loader loads classes having a common namespace and associated with different versions of the management software. For one embodiment, the non-system class loader dynamically learns and loads a plurality of generic Java applications having a common namespace.

The method 400 further includes sending the requested class to a Java system class loader if the requested class belongs to the Java system namespace at block 424. The Java system class loader locates the requested class from a system class path, application class path, or from local disk and loads the requested class into memory at block 426. The method 400 further includes transferring subsequent discovery calls to the mediation agent in order to obtain information associated with one or more of the network elements such as detailed device information at block 428. The detailed device information may include the type of interfaces available, the number of interfaces, the current interface status, and the diagnostic information associated with the interfaces.

Embodiments of the present invention provide software solutions for managing network elements running disparate software versions in a network such as a telecommunications network. The software solutions are simple and easy to integrate with prior software solutions. Additional management support or functionality for a future software version can be easily obtained by modifying a configuration file which essentially eliminates the need for any new development cycle.

From the above description and drawings, it will be understood by those of ordinary skill in the art that the particular embodiments shown and described are for purposes of illustration only and are not intended to limit the scope of the invention. Those of ordinary skill in the art will recognize that embodiments of the invention may be embodied in other specific forms without departing from its spirit or essential characteristics. References to details of particular embodiments are not intended to limit the scope of the claims.

What is claimed is:

1. In an environment with management software interacting with network elements via a Java remote method invocation (RMI) call, a method, comprising:
transferring the Java remote method invocation (RMI) call to a network element in order to obtain a version of the management software associated with the network element;
determining if a requested class to be loaded by a class loader based on the RMI call belongs to a system namespace or a non-system namespace;
obtaining a byte code associated with the requested class from a class hash with a class name key if the requested class belongs to the non-system namespace; and
dynamically loading the requested class and associated byte code to a Java virtual machine (JVM) with a non-system class loader if the requested class belongs to the non-system namespace, the non-system class loader to load classes having a common namespace and associated with different versions of the management software.

2. The method as in claim 1, wherein at runtime the non-system class loader to dynamically learn and load a plurality of generic Java applications having a common namespace.

3. The method as in claim 1, further comprises:
sending the requested class to a Java system class loader if the requested class belongs to the system namespace, the Java system class loader loads the requested class into the JVM to be processed by an execution engine of the JVM.

4. The method as in claim 1, further comprises:
determining if the non-system class loader associated with the version of the management software obtained from the network element is located in a cache; and
obtaining the non-system class loader if located in cache.

5. The method as in claim 4, further comprises:
obtaining a jar file location from a configuration file, the jar file associated with the version of the management software obtained from the network element if the non-system class loader is not located in the cache;
reading class file entries of the jar file;
converting each class file into a byte array; and
adding the byte arrays into a hash table keyed by a class name.

6. The method as in claim 1, further comprising:
transferring a first discovery call to a mediation agent in order to discover network elements within a network.

7. The method as in claim 6, further comprising:
transferring a second discovery call to the mediation agent in order to obtain information associated with the network element.

8. The method as in claim 1, wherein the Java RMI call to operate through an application programming interface (API).

9. The method as in claim 1, wherein transferring the Java RMI call is either one of issuing, initiating or receiving the Java RMI call.

10. The method of claim 1, wherein the management software to manage a network of network elements that form at least two sets of network elements with each set running a disparate software version of the management software.

11. A machine readable non-transitory medium storing executable program instructions which when executed cause a data processing system to perform a method comprising:
transferring the Java remote method invocation (RMI) call to a network element in order to obtain a version of the management software associated with the network element;
determining if a requested class to be loaded by a class loader based on the RMI call belongs to a system namespace or a non-system namespace;
obtaining a byte code associated with the requested class from a class hash with a class name key if the requested class belongs to the non-system namespace; and
dynamically loading the requested class and associated byte code to a Java virtual machine (JVM) with a non-system class loader if the requested class belongs to the non-system namespace, the non-system class loader to load classes having a common namespace and associated with different versions of the management software.

12. The medium as in claim 11, wherein at runtime the non-system class loader to dynamically learn and load a plurality of generic Java applications having a common namespace.

13. The medium as in claim 11, further comprises:
sending the requested class to a Java system class loader if the requested class belongs to the system namespace, the Java system class loader loads the requested class into the JVM to be processed by an execution engine of the JVM.

14. The medium as in claim 11, further comprises:
determining if the non-system class loader associated with the version of the management software obtained from the network element is located in a cache; and
obtaining the non-system class loader if located in cache.

15. The medium as in claim 14, further comprises:
obtaining a jar file location from a configuration file, the jar file associated with the version of the management software obtained from the network element if the non-system class loader is not located in the cache;
reading class file entries of the jar file;
converting each class file into a byte array; and
adding the byte arrays into a hash table keyed by a class name.

16. The medium as in claim 11, further comprising:
transferring a first discovery call to a mediation agent in order to discover network elements within a network.

17. The medium as in claim 16, further comprising:
transferring a second discovery call to the mediation agent in order to obtain information associated with the network element.

18. The medium as in claim 11, wherein the Java RMI call to operate through an application programming interface (API).

19. The medium as in claim 11, wherein transferring the Java RMI call is either one of issuing, initiating or receiving the Java RMI call.

20. The medium of claim 11, wherein the management software to manage a network of network elements that form at least two sets of network elements with each set running a disparate software version of the management software.

21. A system for managing network elements within a network, comprising:
a plurality of network elements in the network;
a client having management software to manage the network elements;
a processing unit to execute the management software in order to perform the following operations:
transferring the Java remote method invocation (RMI) call to a network element in order to obtain a version of the management software associated with the network element;
determining if a requested class to be loaded by a class loader based on the RMI call belongs to a system namespace or a non-system namespace;
obtaining a byte code in a class hash with a class key if the requested class belongs to the non-system namespace; and
loading the requested class and associated byte code to a Java virtual machine (JVM) with a non-system class loader if the requested class belongs to the non-system namespace, the non-system class loader to load classes having a common namespace and associated with different versions of the management software.

22. The system of claim 21, wherein the network element comprises a broadband loop carrier to provide voice and data communications via the network.

23. The system of claim 21, wherein the management software comprises a client software to provide a user interface to a front end server, a backend server software to perform network functions, and the front end server software to transmit information between the client software and the back end server.

24. The system of claim 21, wherein each network element operates a version of the management software with a plurality of versions operating within a network.

25. The system of claim 21, wherein the management software to manage a network of network elements that form at least two sets of network elements with each set running a disparate software version of the management software.

26. An apparatus for managing a network, comprising:
means for transferring the Java remote method invocation (RMI) call to a network element in order to obtain a version of the management software associated with the network element;
means for determining if a requested class to be loaded by a class loader based on the RMI call belongs to a system namespace or a non-system namespace;
means for obtaining a byte code in a class hash with a class key if the requested class belongs to the non-system namespace; and
means for loading the requested class and associated byte code to a Java virtual machine (JVM) if the requested class belongs to the non-system namespace, the means for loading to load classes having a common namespace and associated with different versions of the management software.

27. The apparatus as in claim 26, further comprises:
means for sending the requested class to a Java system class loader if the requested class belongs to the system namespace, the Java system class loader loads the requested class into memory.

28. The apparatus as in claim 26, further comprises:
means for determining if the non-system class loader associated with the version of the management software obtained from the network element is located in a cache; and
means for obtaining the non-system class loader if located in cache.

29. The apparatus as in claim 26, further comprises:
means for obtaining a jar file from a configuration file, the jar file associated with the version of the management software obtained from the network element if the non-system class loader is not located in the cache;
means for reading class file entries of the jar file;
means for converting each class file into a byte array; and
means for adding the byte arrays into a hash table keyed by a class name.

* * * * *